United States Patent [19]
Morby et al.

[11] 3,801,875
[45] Apr. 2, 1974

[54] NON-METALLIC LOAD CENTER WITH IMPROVED BUS BAR CONSTRUCTION

[75] Inventors: John Alfred Morby, Bristol; James Edward McGann, Forestville, both of Conn.

[73] Assignee: General Electric Company, New York, N.Y.

[22] Filed: June 14, 1973

[21] Appl. No.: 369,867

[52] U.S. Cl............. 317/120, 174/72 B, 317/119, 200/166 CT
[51] Int. Cl........................ H02b 1/04, H02b 1/20
[58] Field of Search............. 200/166 CT; 339/242; 174/70 B, 71 B, 72 B; 317/118–120

[56] References Cited
UNITED STATES PATENTS

| | | | |
|---|---|---|---|
| 2,811,704 | 10/1957 | Newman | 200/166 CT |
| 3,694,701 | 9/1972 | Stanback | 317/118 |
| 3,333,158 | 7/1967 | Speck | 317/120 |
| 3,743,892 | 7/1973 | Fritz | 317/119 |

*Primary Examiner*—James R. Scott
*Assistant Examiner*—Gerald P. Tolin
*Attorney, Agent, or Firm*—Robert A. Cahill; Philip L. Schlamp; Frank L. Neuhauser

[57] ABSTRACT

A non-metallic load center comprises an insulative, molded plastic enclosure consisting of a housing having integrally formed back and sidewalls and a separable cover. An elongated bus bar having first and second strip portions interconnected by spaced L-shaped ribs is secured adjacent its ends to integrally formed mounting posts. Bus bar contacts extend into each gap between adjacent ribs to facilitate electrical contacting engagement with individual circuit breakers, while the ribs afford lateral stability to the individual circuit breaker installations. Integrally formed pedestals afford bus bar support intermediate its ends and also serve to support and locate a connector lug carried by the bus bar.

8 Claims, 5 Drawing Figures

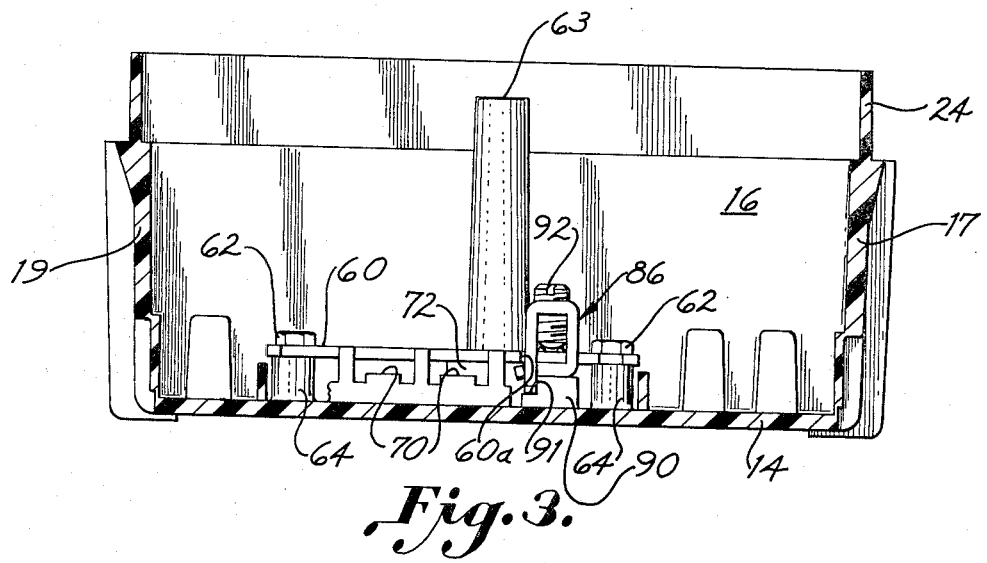
Fig.3.
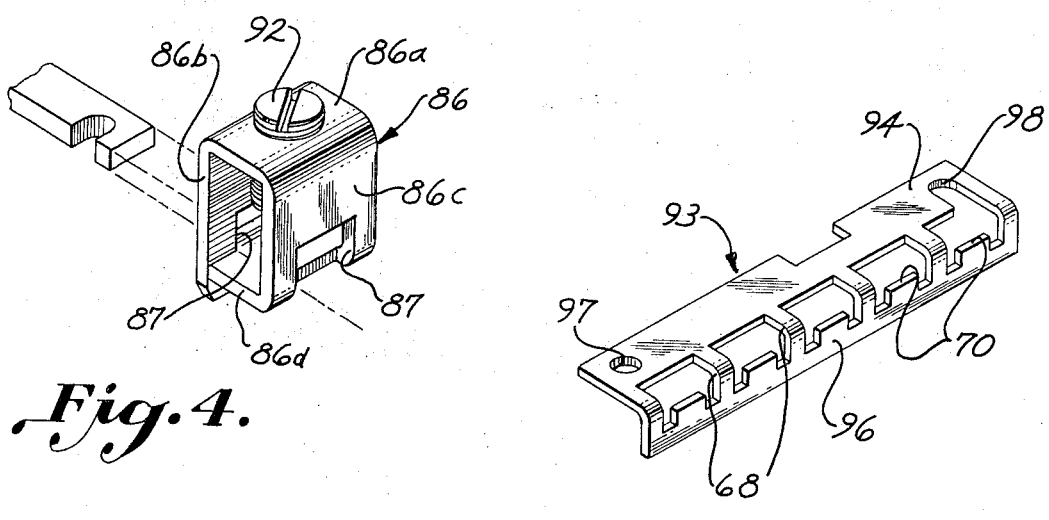
Fig.4.
Fig.5.

NON-METALLIC LOAD CENTER WITH IMPROVED BUS BAR CONSTRUCTION

BACKGROUND OF THE INVENTION

Heretofore, enclosures for electrical equipment, such as circuit breaker panelboards or load centers, have invariably been metallic. These metallic enclosures are manufactured in mass production from metal sheets in a succession of operations, including cutting, blanking, forming and welding, to create a box-like housing, which must then be painted. The enclosure covers are similarly produced in a succession of operations. A number of components, including component mounting and supporting elements, must then be assembled in the box-like housing. Since the metallic enclosure is electrically conductive, insulators must be incorporated into the mounting of the various bus bars to the enclosure.

Recently, a non-metallic, molded plastic electrical equipment enclosure in the form of a circuit breaker panelboard or load center has been introduced in the market and offers numerous advantages over its metallic counterpart. The complete box-like housing can be created in a single molding operation, as can the cover. Painting is unnecessary, and the plastic can be readily tinted and the mold designed to create a surface finish which is esthetically pleasing. Moreover, mounting and supporting elements may be integrally formed with the enclosure, thus simplifying assembly. In this context, the assembly of separate insulating members is obviated since the enclosure itself is an excellent insulator. As a consequence, a molded plastic enclosure is cheaper to manufacture in mass production than a comparable metallic enclosure. Moreover, electricians have found the molded plastic enclosure more convenient to install and wire.

It is accordingly an object of the present invent to provide a non-metallic, molded plastic enclosure of the above character particularly adapted as a circuit breaker panelboard or load center.

Still another object of the invention is to provide a molded plastic circuit breaker load center of the above character, having an improved main bus bar configuration.

A further object is to provide a non-metallic load center of the above character incorporating improved provisions for mounting and supporting the main bus bar.

Other objects of the invention will in part be obvious and in part appear hereinafter.

SUMMARY OF THE INVENTION

In accordance with the invention, there is provided a non-metallic, molded plastic enclosure for electrical equipment, such as a panelboard or load center for circuit breakers, having integrally formed back and sidewalls in the configuration of a box-like housing. A separable molded plastic cover for the housing completes the enclosure. Integrally formed with the housing are the requisite mounting and supporting provisions for the various electrical components, including a pair of spaced mounting posts on which the ends of a main bus bar are secured. The main bus bar is uniquely structured and configured to accept electrical contacting engagement with individual circuit breakers, while affording lateral stabilization to the individual circuit breaker installations. Moreover, the housing is structured to lend mechanical support to the main bus bar, particularly during circuit breaker installation and wiring at the site of utilization.

More specifically, the main bus bar includes first and second elongated, planar conductive portions arranged at right angles and interconnected by a series of spaced, L-shaped ribs. The first portion is secured adjacent its ends to the mounting posts in parallel, spaced relation to the housing backwall. The free edge of the second portion rests against the housing backwall and is formed having a blade contact extending from its opposite edge at each location between adjacent ribs. The spacing between adjacent ribs closely approximates the standard width of a circuit breaker at its contact location. Consequently, upon installation of a circuit breaker in electrically contacting engagement with each main bus bar contact, the forces of installation on the main bus bar are resisted by the housing backwall's engagement with the free edge of the bus bar second portion. Moreover, the ribs lend lateral stability to the circuit breaker installations.

It will be appreciated that, since the housing itself is of an electrically insulating plastic material, separate electrically insulating members interposed between the engaging surfaces of the main bus bar and the housing are unnecessary.

In an alternate embodiment of the invention, the main bus bar is structured to accept a lug connector which is located and supported, particularly during the connection of a main line thereto, by a pedestal integrally formed with the housing.

DESCRIPTION OF THE DRAWINGS

FIG. 3 is a sectional view taken along line 3—3 of FIG. 2;

FIG. 4 is a perspective view of the main lug connector and a portion of the main bus bar seen in FIGS. 2 and 3; and FIG. 5 is a perspective view of a main bus bar constructed in accordance with an alternate embodiment of the invention.

Like reference numerals refer to corresponding parts throughout the several views of the drawings.

DETAILED DESCRIPTION

Figure 1:
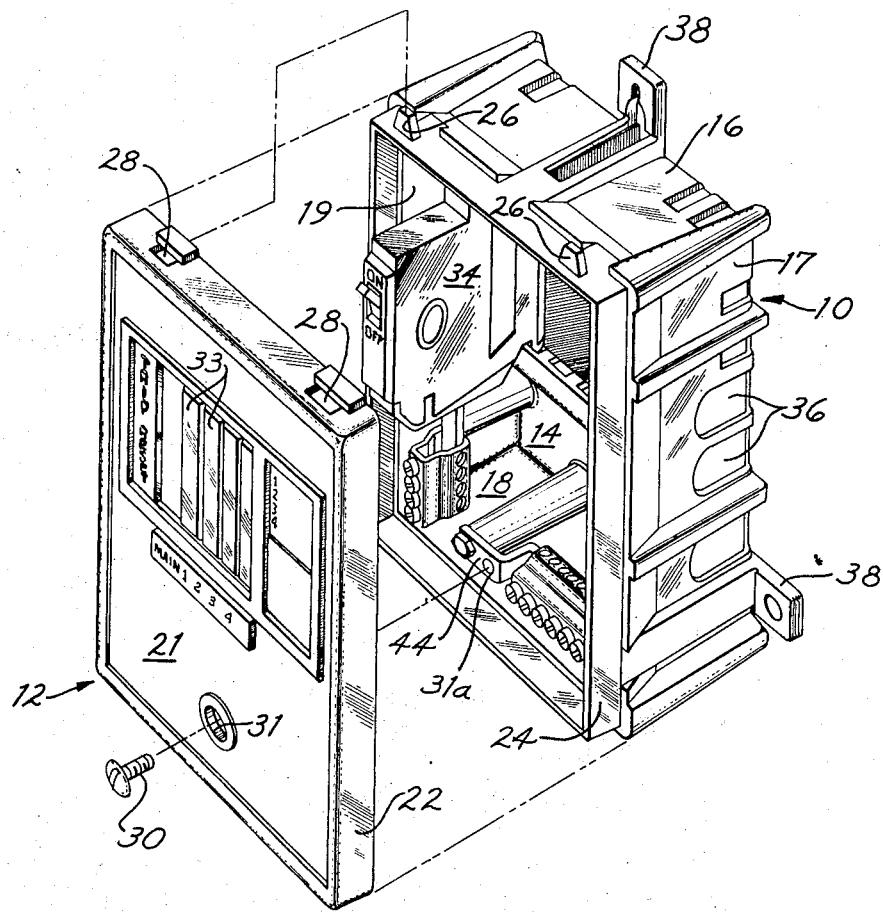
FIG. 1 is a perspective view of a non-metallic enclosure for electrical equipment constructed in accordance with the invention to include a molded plastic, box-like housing and a separable molded plastic cover.

A non-metallic enclosure for electrical equipment, constructed according to the invention, is seen in FIG. 1 to include a molded plastic, box-shaped housing, generally indicated at 10, and a separable cover, generally indicated at 12. The housing and cover are formed of a suitable plastic, preferably a thermoplastic material, such as a phenylene-oxide thermoplastic marketed by General Electric under the trademark NORYL. The housing 10, also seen in FIG. 2, comprises a backwall 14 and four integral sidewalls 16, 17, 18 and 19. Cover 12 comprises a front wall 21 and shallow sidewalls 22, all formed in a single molding operation. The housing sidewalls terminate in a perimetrical lip 24 surrounding the open front of the housing 10, which is telescopically received within cover sidewalls 22 when cover 12 is mounted in place. Referring to FIG. 1, the upper horizontal portion of lip 24 carries a pair of molded, pyramidal-shaped hooks 26 which are received in apertures 28 molded in the upper cover sidewall 22, and the cover is pivoted into closure relation with the housing. The cover is held in place by a screw 30 passing through aperture 31 and threaded through a hole 31a in an equipment ground bus bar 44.

The front wall 21 of cover 12 is molded to provide a row of knockouts 33 which are removed to provide apertures accommodating the protrusion, with the cover in place, of the digitally operative portion of circuit breakers installed in housing 10, one being shown so installed at 34 in FIG. 1. The back and sidewalls of housing 10 are molded to provide a series of conveniently located knockouts 36 which are selectively removed to accommodate the introduction of cable during wiring installation of the load center. Tabs 38 integrally molded with housing 10 facilitate the physical mounting of the load center at the site of wiring installation.

Figure 2:
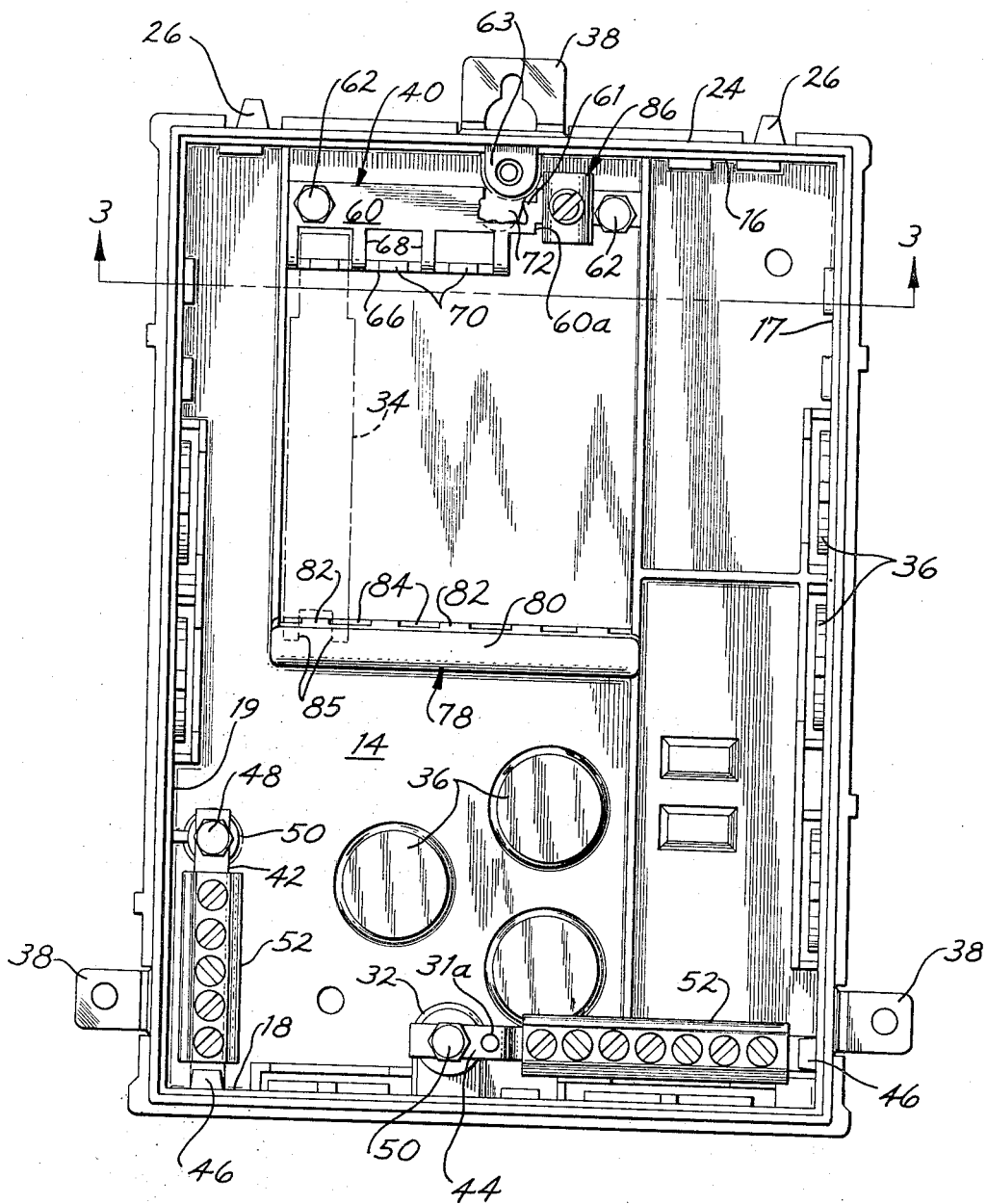
FIG. 2 is a plan view from the open side of the housing of FIG. 1.

Turning to FIG. 2, assembled in housing 10 are three bus bars, namely, a main bus bar, generally indicated at 40, a neutral bus bar 42 and an equipment ground bus bar 44. Neutral bus 42 is captured at one end in a molded keyway 46 integrally formed with housing sidewall 18 and is locked in place by a screw 48 passing through a hole (not shown) in its other end and threaded into a mounting post 50, also integrally formed with housing 10. Neutral bus 42 carries a connector 52 facilitating the clamping of the bare ends of neutral wires (not shown) in electrical contacting engagement therewith. Equipment ground bus 44 is similarly mounted at its ends by a molded keyway 46, integral with housing sidewall 17, and mounting post 32 by a screw 50. A connector 52 similarly facilitates clamping the bare ends of ground wires in electrical contacting engagement with bus 44.

The main bus bar 40, as seen in FIGS. 2 and 3, includes an elongated planar conductive strip 60 mounted adjacent its end in parallel spaced relationship to housing backwall 14 by mounting posts 64, integrally molded with the housing backwall. Strip 60 is clamped in place by the heads of screws 62 threaded into mounting posts 64. A notch 61 in strip 60 provides clearance with respect to a molded mounting post 63 used in mounting an alternative cover form. A second planar, conductive strip 66, extending in the same direction as strip 60 but arranged at a right angle thereto, is interconnected to strip 60 by a series of spaced, L-shaped ribs 68. The bottom edge of strip 66 rests on housing backwall 14, as best seen in FIG. 3. A blade contact 70 extends upwardly from the upper edge of strip 66 into the gap between each adjacent pair of ribs 68. The spacing between adjacent ribs corresponds to the standard width of the circuit breaker 34 in the area of its contacts, as seen in phantom in FIG. 2, such that the ribs afford lateral stability to the individual circuit breakers when installed in electrical contacting engagement with the respective blade contacts 70. That is, the ribs 68 bear against the circuit breaker case sidewalls to resist any lateral sway of the circuit breakers. Moreover, the support afforded by the housing backwall, against which the bottom edge of the strip 66 rests, is effective, particularly during circuit breaker installation, to resist damage to the main bus 40. In addition, a pedestal 72, integrally formed with housing 10, affords underlying mid-length support for strip 60 of main bus bar 40 to resist any distortional forces which may be exerted thereon.

The individual circuit breaker installations are sustained by a common retaining member, integrally molded with housing backwall 14 and generally indicated at 78. Breaker retaining member 78 includes a flange 80 molded in offset relation to housing backwall 14. The free edge of this flange is interconnected back to the backwall by a series of spaced tabs 82 to form openings 84 arrayed in confronting relation to main bus 40. As seen in FIGS. 1 and 2, the breaker case is formed with a pair of spaced hooks 85 which are inserted in adjacent openings 84 to straddle the intervening tab 82. The circuit breaker 34 is then pivoted into electrical contacting engagement with the aligned one of the contacts 70.

The main bus 40 seen in FIGS. 2 and 3, is structured to accept a lug connector, carried by strip 60 and generally indicated at 86. Strip 66 is shorter in length than strip 60, such that main bus 40 accepts three circuit breakers in the illustrated embodiment; the lug connector being carried by the portion of strip 60 extending beyond strip 66. Lug connector 86, as best seen in FIG. 4, is formed from a conductive strip into a rectangular configuration having a top wall 86a, sidewalls 86b and 86c, and bottom wall 86d. The connector sidewalls are formed with aligned slots 86 through which the end of strip 66 extends in mounting connector lug 86 to bus bar 40. The free end of bottom wall 86d is formed with a tongue 88 (FIGS. 3 and 4) which extends through the lower portion of slot 87 in connector lug sidewall 86b. As seen in FIG. 2, strip 60 is provided with a shoulder 60a which engages sidewall 86b to establish the leftmost position of connector lug 86 on bus bar 40. Then, as seen in FIG. 3, a supporting pedestal 90 is integrally formed with housing backwall 14 at a location to provide a seat for connector lug 86 when main bus bar 40 is factory assembled in housing 10. To establish the right-most portion of the connector lug on the main bus bar, pedestal 90 is relieved, as indicated at 91, to accommodate the lower extension of sidewall 86b beyond bottom wall 86d. A set screw 92 is advanced through a threaded hole in top wall 86a into the open interior of the connector lug to clamp the inserted bare end of the line conductor (not shown) into electrically contacting engagement with the main bus bar. The forces exerted incident to this wiring operation are resisted by pedestal 90 to prevent distortion and damage to the main bus bar.

The alternative main bus configuration, seen in FIG. 5 and generally indicated at 93, accommodates the application of power to the main bus via a main circuit breaker, rather than a lug connector as in the first embodiment. As a consequence, main bus strips 94 and 96 are coextensive in length to accommodate, in the illustrated embodiment, five circuit breakers in the spaces between interconnecting ribs 68. Main bus 93 is assembled in housing 10 in the same manner as main bus 40 with screws 62 passing through hole 97 and slot 98 located adjacent the ends of strip 94; the screws threading into mounting posts 64. Notch 61 in strip 94 affords clearance from mounting post 63. While pedestal 90 terminates in spaced relation to strip 94, pedestal 72 provides mid-length support for bus bar 93. As in the case of bus bar 40, the bottom edge of strip 96 rests on the backwall 14 of housing 10 to support bus bar 93 during circuit breaker installation.

It will be appreciated that the advantages afforded by the main bus bar constructions disclosed herein are also obtained when assembled in metallic electrical equipment enclosures. All that is required is the inclusion of electrically insulating elements in the mounting provisions for bus bars 40 or 93 to provide isolation from the metallic enclosure.

It will thus be seen that the objectives set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A circuit breaker panelboard, comprising, in combination:
   A. a molded, electrically insulative housing including a backwall and integrally formed, upstanding sidewalls;
   B. a cover for said housing;
   C. a pair of spaced mounting posts integrally formed with one of said walls;
   D. a bus bar including
      1. a first elongated strip portion having means adjacent each end facilitating securing said first strip portion to said mounting posts in generally parallel, spaced relation to said backwall,
      2. a second elongated strip portion,
      3. a series of L-shaped ribs inter-connecting said first and second strip portions, and
      4. an integral blade contact carried by said second strip portion and projecting into each gap between adjacent ribs,
      5. the spacing between adjacent ribs corresponding to the width of a circuit breaker case, whereby said ribs act to laterally stabilize the individual circuit breakers when installed in electrically contacted engagement with respective ones of said blade contacts; and
   E. common circuit breaker retaining means integrally formed with said backwall in parallel spaced relation to said bus bar.

2. The panelboard defined in claim 1, wherein an edge of said second strip portion rests on and is supported by said backwall during the installation of circuit breakers.

3. A panelboard defined in claim 1, wherein said first and second strip portions are coextensive in length.

4. The panelboard defined in claim 1, which further includes a pedestal integrally formed with one of said walls and located to provide mid-length support to said first strip portion.

5. The panelboard defined in claim 1, wherein said second strip portion terminates short of one end of said first strip portion, said panelboard further including an electrical connector mounted by said first strip portion at a location beyond the termination of said first strip portion.

6. The panelboard defined in claim 5, wherein said connector is formed having aligned slots accommodating the extension therethrough of the first strip portion, said panelboard further including a pedestal integrally formed with said backwall and located to provide support for said connector.

7. The panelboard defined in claim 6, wherein said first strip portion carries an abutment for engagement with said connector to establish its approximate position on said first strip portion in one direction, and said pedestal is formed having means for engaging means carried by said connector to locate its approximate position on said first strip portion in the opposite direction.

8. A circuit breaker panelboard, comprising, in combination:
   A. a housing including a backwall and upstanding sidewalls;
   B. a cover for said housing;
   C. a pair of spaced mounting means supported in said housing;
   D. a bus bar including:
      1. a first elongated strip portion having means adjacent each end facilitating securing said first strip portion to said mounting means in generally parallel, spaced relation to said backwall,
      2. a second elongated strip portion,
      3. a series of L-shaped ribs inter-connecting said first and second strip portions, and
      4. an integral blade contact carried by said second strip portion and projecting into each gap between adjacent ribs,
      5. the spacing between adjacent ribs corresponding to the width of a circuit breaker case, whereby said ribs act to laterally stabilize the individual circuit breakers when installed in electrically contacted engagement with respective ones of said blade contacts; and
   E. common circuit breaker retaining means positioned in said housing in parallel spaced relation to said bus bar.

* * * * *